US011675595B2

(12) United States Patent
Liu et al.

(10) Patent No.: US 11,675,595 B2
(45) Date of Patent: Jun. 13, 2023

(54) STARTING READING OF INSTRUCTIONS FROM A CORRECT SPECULATIVE CONDITION PRIOR TO FULLY FLUSHING AN INSTRUCTION PIPELINE AFTER AN INCORRECT INSTRUCTION SPECULATION DETERMINATION

(71) Applicant: ALIBABA GROUP HOLDING LIMITED, George Town (KY)

(72) Inventors: Chang Liu, Shanghai (CN); Ruqin Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/031,397

(22) Filed: Sep. 24, 2020

(65) Prior Publication Data

US 2021/0089319 A1 Mar. 25, 2021

(30) Foreign Application Priority Data

Sep. 25, 2019 (CN) .......................... 201910912615.4

(51) Int. Cl.
*G06F 9/38* (2018.01)
*G06F 9/30* (2018.01)

(52) U.S. Cl.
CPC ........ *G06F 9/3842* (2013.01); *G06F 9/30145* (2013.01); *G06F 9/3804* (2013.01); *G06F 9/3861* (2013.01)

(58) Field of Classification Search
CPC .............................. G06F 9/3861; G06F 9/3859
See application file for complete search history.

(56) References Cited

U.S. PATENT DOCUMENTS 5,604,877 A * 2/1997 Hoyt ..................... G06F 9/3806
712/243
5,687,338 A * 11/1997 Boggs ................... G06F 9/3802
711/137

(Continued)

OTHER PUBLICATIONS

International Search Report and written opinion in related international Application No. PCT/US 20/52407, dated Feb. 2, 2021 (8 pgs.).

*Primary Examiner* — Keith E Vicary
(74) *Attorney, Agent, or Firm* — Finnegan, Henderson, Farabow, Garrett & Dunner, LLP

(57) ABSTRACT

An apparatus includes instruction fetching circuitry to read a set of instructions, including a speculative execution instruction and a speculative condition determination instruction; cache the instructions; and read the speculative execution instruction corresponding to the speculative condition of the speculative condition determination instruction. If an execution result of the speculative condition determination instruction indicates the speculative condition is incorrect, clear the instructions cached in the instruction fetching circuitry. Instruction decoding circuitry decodes instructions. Executing circuitry executes instructions, including executing the speculative condition determination instruction to obtain the execution result. Instruction retiring circuitry caches instructions executed by the executing circuitry, and in response to an instruction older than the speculative condition determination instruction being retired, instructs the executing circuitry to clear instructions in the executing circuitry and clear the instructions cached in the instruction retiring circuitry.

16 Claims, 6 Drawing Sheets

(56) References Cited

U.S. PATENT DOCUMENTS

| | | | | |
|---|---|---|---|---|
| 6,079,014 A | * | 6/2000 | Papworth | G06F 9/3806 |
| | | | | 712/1 |
| 6,332,191 B1 | * | 12/2001 | Witt | G06F 9/30149 |
| | | | | 712/237 |
| 7,152,155 B2 | * | 12/2006 | McIlvaine | G06F 9/3838 |
| | | | | 712/239 |
| 2002/0144096 A1 | * | 10/2002 | Burch | G06F 9/382 |
| | | | | 712/218 |
| 2004/0221140 A1 | * | 11/2004 | Filippo | G06F 9/3865 |
| | | | | 712/225 |
| 2006/0282829 A1 | * | 12/2006 | McIlvaine | G06F 9/3867 |
| | | | | 717/131 |
| 2007/0074006 A1 | * | 3/2007 | Martinez | G06F 9/3859 |
| | | | | 712/218 |
| 2010/0131742 A1 | * | 5/2010 | Col | G06F 9/3885 |
| | | | | 712/220 |
| 2010/0262807 A1 | * | 10/2010 | Burky | G06F 9/3861 |
| | | | | 712/205 |
| 2015/0278097 A1 | | 10/2015 | Kelm et al. | |
| 2016/0350116 A1 | * | 12/2016 | Reddy | G06F 9/30058 |
| 2019/0227806 A1 | * | 7/2019 | Kincaid | G06F 9/3016 |

* cited by examiner

STARTING READING OF INSTRUCTIONS FROM A CORRECT SPECULATIVE CONDITION PRIOR TO FULLY FLUSHING AN INSTRUCTION PIPELINE AFTER AN INCORRECT INSTRUCTION SPECULATION DETERMINATION

CROSS REFERENCE TO RELATED APPLICATION

This disclosure claims the benefits of priority to Chinese application number 201910912615.4, filed Sep. 25, 2019, which is incorporated herein by reference in its entirety.

TECHNICAL FIELD

The present disclosure relates to the field of processors, and in particular, to a processor core and a processor for speculative execution.

BACKGROUND

Modern processors or processor cores process instructions in a pipelined manner. A typical pipeline usually includes various pipeline stages such as instruction fetching, instruction decoding, instruction scheduling, instruction execution, and instruction retirement. In a high-performance multi-transmitting processor, at the instruction decoding stage, a plurality of instructions can be sequentially decoded in the same clock cycle, and then at the instruction scheduling stage, the sequentially decoded instructions can be transmitted out of order to each instruction execution stage according to instruction types and an instruction execution state of the downstream of the pipeline, so that a plurality of instructions are executed simultaneously at the instruction execution stage. Finally, at the instruction retirement stage, the executed instructions are sequentially exited, thereby completing the execution of an instruction in the processor.

SUMMARY

Embodiments of the present disclosure provide an apparatus, comprising: an instruction fetching circuitry configured to: read a set of instructions, wherein the set of instructions comprises a speculative execution instruction and a speculative condition determination instruction, and the speculative execution instruction is an instruction to be executed according to a speculative condition of the speculative condition determination instruction; cache one or more instructions of the set of instructions in the instruction fetching circuitry; in response to a determination that the speculative condition determination instruction has been read, read the speculative execution instruction corresponding to the speculative condition of the speculative condition determination instruction, and in response to a determination that an execution result of the speculative condition determination instruction indicates that the speculative condition is incorrect, clear the one or more instructions cached in the instruction fetching circuitry; an instruction decoding circuitry configured to decode the set of instructions; an executing circuitry configured to execute the one or more instructions of the set of instructions, wherein the operation of executing the one or more instructions comprises executing the speculative condition determination instruction to obtain the execution result; and an instruction retiring circuitry configured to: cache in the instruction retiring circuitry the one or more instructions of the set of instructions executed by the executing circuitry; and in response to an instruction older than the speculative condition determination instruction being retired, instruct the executing circuitry to clear the instructions being executed in the executing circuitry and clear the instructions cached in the instruction retiring circuitry.

Embodiments of the present disclosure further provide a method, comprising: reading a set of instructions, wherein the set of instructions comprises a speculative execution instruction and a speculative condition determination instruction, and the speculative execution instruction is an instruction to be executed according to a speculative condition of the speculative condition determination instruction; caching one or more instructions of the set of instructions in an instruction fetching circuitry; in response to a determination that the speculative condition determination instruction has been read, reading the speculative execution instruction corresponding to the speculative condition of the speculative condition determination instruction; decoding the set of instructions by an instruction decoding circuitry; executing the one or more instructions by an executing circuitry, wherein executing the one or more instructions by the executing circuitry comprises executing the speculative condition determination instruction to obtain an execution result; in response to a determination that the execution result of the speculative condition determination instruction indicates that the speculative condition is incorrect, clear the one or more instructions cached in the instruction fetching circuitry; caching in an instruction retiring circuitry the one or more instructions of the set of instructions executed by the executing circuitry; and in response to an instruction older than the speculative condition determination instruction being retired: clearing the instructions being executed in the executing circuitry, and clearing the instructions cached in the instruction retiring circuitry.

Embodiments of the present disclosure further provide a system-on-chip, comprising: an instruction processing apparatus, comprising: an instruction fetching circuitry configured to: read a set of instructions, wherein the set of instructions comprises a speculative execution instruction and a speculative condition determination instruction, and the speculative execution instruction is an instruction to be executed according to a speculative condition of the speculative condition determination instruction; cache one or more instructions of the set of instructions in the instruction fetching circuitry; in response to a determination that the speculative condition determination instruction has been read, read the speculative execution instruction corresponding to the speculative condition of the speculative condition determination instruction, and in response to a determination that an execution result of the speculative condition determination instruction indicates that the speculative condition is incorrect, clear the one or more instructions cached in the instruction fetching circuitry; an instruction decoding circuitry configured to decode the set of instructions; an executing circuitry configured to execute the one or more instructions of the set of instructions, wherein the operation of executing the one or more instructions comprises executing the speculative condition determination instruction to obtain the execution result; and an instruction retiring circuitry configured to: cache in the instruction retiring circuitry the one or more instructions of the set of instructions executed by the executing circuitry; and in response to an instruction older than the speculative condition determination instruction being retired, instruct the executing circuitry to clear the instructions being executed in the executing circuitry and clear the instructions cached in the instruction retiring circuitry.

Embodiments of the present disclosure further provide an intelligent device, comprising: a system-on-chip, comprising: an instruction processing apparatus, comprising: an instruction fetching circuitry configured to: read a set of instructions, wherein the set of instructions comprises a speculative execution instruction and a speculative condition determination instruction, and the speculative execution instruction is an instruction to be executed according to a speculative condition of the speculative condition determination instruction; cache one or more instructions of the set of instructions in the instruction fetching circuitry; in response to a determination that the speculative condition determination instruction has been read, read the speculative execution instruction corresponding to the speculative condition of the speculative condition determination instruction, and in response to a determination that an execution result of the speculative condition determination instruction indicates that the speculative condition is incorrect, clear the one or more instructions cached in the instruction fetching circuitry; an instruction decoding circuitry configured to decode the set of instructions; an executing circuitry configured to execute the one or more instructions of the set of instructions, wherein the operation of executing the one or more instructions comprises executing the speculative condition determination instruction to obtain the execution result; and an instruction retiring circuitry configured to: cache in the instruction retiring circuitry the one or more instructions of the set of instructions executed by the executing circuitry; and in response to an instruction older than the speculative condition determination instruction being retired, instruct the executing circuitry to clear the instructions being executed in the executing circuitry and clear the instructions cached in the instruction retiring circuitry.

DETAILED DESCRIPTION

Figure 1:
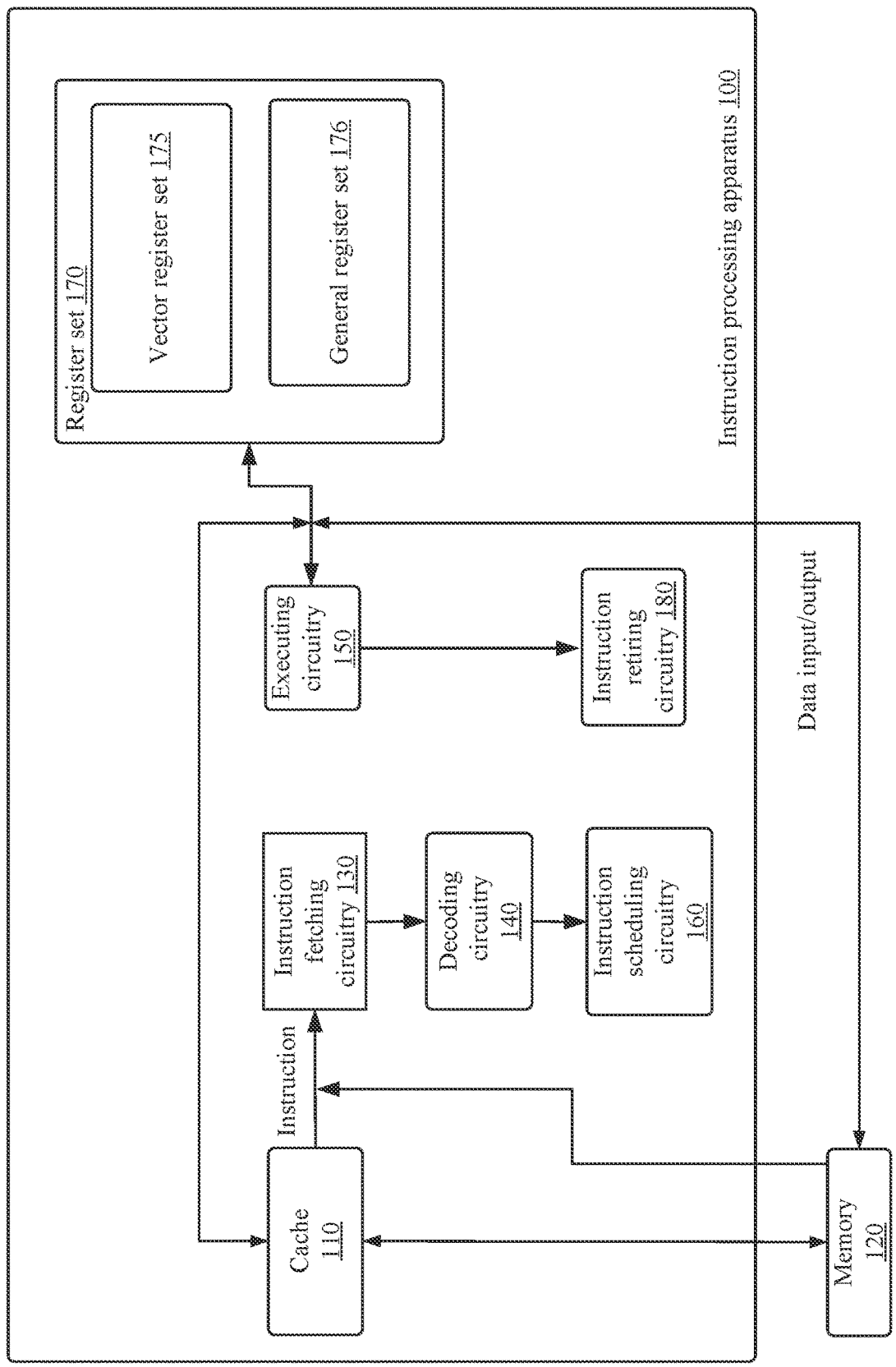
FIG. 1 is a schematic of an example instruction processing apparatus, according to some embodiments of the present disclosure.

To make the objectives, technical solutions and advantages of the embodiments of the present disclosure clearer, the technical solutions in the embodiments of the present disclosure are described below with reference to the accompanying drawings in the embodiments of the present disclosure. The described embodiments are merely some rather than all of the embodiments of the present disclosure. Based on the embodiments in the present disclosure, all other embodiments obtained by those with ordinary skill in the art without creative efforts should fall within the protective scope of the present disclosure.

To improve the performance of a processor core, a speculative execution (also referred to as opportunistic execution) method may be used in the processor core. The speculative execution method can allow the processor to assume the existence of a speculative premise (e.g., a jump target of a jump branch instruction) at the instruction fetching stage or decoding stage based on information such as previous execution conditions, and read subsequent instructions under this speculative premise for speculative execution. In other words, the processor can execute a newer instruction in advance before the execution of an older instruction is completed. If the speculation turned out to be correct, an execution result of the new instruction can be considered valid. This method can effectively improve the performance of the processor.

In addition, if it is determined that the speculation associated with the older instruction is not correct, the processor can submit an execution result of the instruction in advance (e.g., mark in advance a future execution result as submitted) before the execution of the instruction is completed. This means that there may be an early retired instruction in the instruction execution and instruction retirement stages. The early retired instruction can be submitted and retired immediately upon the execution result being generated.

However, once an incorrect speculation occurs (e.g., the speculation fails), the speculatively executed instructions can be determined to be instructions on incorrect paths, and their execution results may be invalid and may be cleared. In many of the existing processor design solutions, it is necessary to wait for the retirement of instructions for executing speculative condition determination (e.g., a jump branch instruction), and then wait for completion of the execution of early retired instructions before clearing the pipeline and initiating an instruction fetching request on a correct path. This conventional method will result in delaying the instruction execution time of the correct path, thereby reducing the performance of the processor. Therefore, there is a need for a new processor pipeline solution that can quickly issue an instruction fetching request to a correct path when a speculation is determined to be incorrect, so as to improve the instruction execution speed on the correct path and improve the performance of the processor.

FIG. 1 is a schematic diagram of an example instruction processing apparatus, according to some embodiments of the present disclosure. In some embodiments, instruction processing apparatus 100 may be a processor, a processor core of a multi-core processor, or a processing element in an electronic system.

As shown in FIG. 1, instruction processing apparatus 100 can include instruction fetching circuitry 130. Instruction fetching circuitry 130 may obtain instructions to be processed from cache 110, memory 120, or other sources, and send the instructions to decoding circuitry 140. In some embodiments, the instructions fetched by instruction fetching circuitry 130 can include high-level machine instructions or macro instructions. Instruction processing apparatus 100 can implement certain functions by executing these instructions.

Decoding circuitry 140 can receive the instructions transmitted from instruction fetching circuitry 130, and decode these instructions. In some embodiments, decoding circuitry 140 can decode the instructions to generate low-level micro-operations, microcode entry points, microcode, or other low-level instructions or control signals. The low-level instructions or control signals may implement operations of high-level instructions through low-level (e.g., circuit-level or hardware-level) operations. Decoding circuitry 140 may be implemented using various different mechanisms. For example, decoding circuitry 140 may be implemented using microcode, lookup tables, and programmable logic arrays ("PLAs"). It is appreciated that the present disclosure is not limited to various mechanisms for implementing decoding circuitry 140, and any mechanism that can implement decoding circuitry 140 falls within the scope of protection of the present disclosure.

In some embodiments, instruction processing apparatus 100 can adopt a pipeline design. Therefore, after instruction fetching circuitry 130 and decoding circuitry 140 read and decode instructions, the instructions can be cached before the instructions are sent to a processing circuitry at a next stage in the pipeline. For example, instruction fetching circuitry 130 can cache the read instructions for sending to decoding circuitry 140 in instruction fetching circuitry 130, and decoding circuitry 140 can cache the decoded instructions for sending to scheduling circuitry 160 in decoding circuitry 140.

In some embodiments, in instruction processing apparatus 100, instructions are sequentially read and decoded in instruction fetching circuitry 130 and decoding circuitry 140. Instruction fetching circuitry 130 and decoding circuitry 140 can be referred to as parts of a front-end pipeline circuitry. In some embodiments, instruction fetching circuitry 130 and decoding circuitry 140 can be collectively referred to as an instruction reading and decoding circuitry. In some embodiments, the front-end pipeline circuitry can include instruction fetching circuitry 130. In some embodiments, the front-end pipeline circuitry can include decoding circuitry 140.

In some embodiments, decoding circuitry 140 sends the decoded instructions to instruction scheduling circuitry 160. Scheduling circuitry 160 can transmit the instructions decoded by decoding circuitry 140 to different executing circuitries 150 according to their instruction types. In some embodiments, scheduling circuitry 160 transmits the decoded instructions out of order to different executing circuitries 150 for execution. In some embodiments, in scheduling circuitry 160, instructions can be cached. For example, in scheduling circuitry 160, an instruction transmission queue can be maintained, in which instructions received from decoding circuitry 140 and to be transmitted to executing circuitries 150 can be stored. In some embodiments, scheduling circuitry 160 can maintain a unified transmission queue for all executing circuitries 150, a dedicated transmission queue for each executing circuitry 150, or a dedicated transmission queue for instructions of a same type so as to transmit the instructions to different executing circuitries 150 that can execute the same type of instructions. It is appreciated that the present disclosure is not limited to a specific form of the transmission queue, and all manners in which the instructions decoded by decoding circuitry 140 can be cached in scheduling circuitry 160 and a transmission queue to be transmitted to various executing units for execution can be maintained fall within the scope of protection of the present disclosure.

In some embodiments, executing circuitry 150 can include a circuit to execute instructions. When executing these instructions, executing circuitry 150 can receive data inputs from register set 170, cache 110, or memory 120. Executing circuitry 150 can output data to register set 170, cache 110, or memory 120.

In some embodiments, register set 170 includes architectural registers. In some embodiments, architectural registers can also be referred to as registers. Unless otherwise specified or apparently shown, phrases such as the architectural register, the register set, and the register can be used to denote registers that are visible to software or programmers (e.g., visible to software) or designated by macro instructions to identify operands. In some embodiments, these registers are different from other non-architectural registers in a given micro-architecture (e.g., a temporary register, a reorder buffer, a retirement register, etc.). In some embodiments, register set 170 may include a set of vector registers 175, wherein each of vector register set 175 may be 512 bits, 256 bits, or 128 bits wide, or different vector widths may be used. In some embodiments, register set 170 may include a set of general registers 176. General register set 176 may be used when executing circuitry 150 executes instructions that includes, for example, instructions that store jump conditions.

It is appreciated that there may be more than one executing circuitry in instruction processing apparatus 100. For example, instruction processing apparatus 100 may include a plurality of executing circuitries of different types, such as an arithmetic circuitry, an arithmetic logic unit ("ALU") circuitry, an integer circuitry, a floating point circuitry, and a branch jump circuitry. In some embodiments, according to characteristics of the instructions transmitted out of order from instruction scheduling circuitry 160 (e.g., the instructions are arithmetic operation instructions, floating-point number calculation instructions, branch jump or unconditional jump instructions, etc.), these instructions can be executed by different executing circuitries 150.

In some embodiments, instruction processing apparatus 100 comprises instruction retiring circuitry 180. After executing circuitry 150 completes the execution of an instruction, instruction retiring circuitry 180 can perform retirement processing on the executed instruction. For example, instruction retiring circuitry 180 can modify content of a register or memory according to the result of the instruction execution, and perform interruption or exception processing.

In some embodiments, instruction processing apparatus 100 is implemented in a pipelined processing manner. Different executing circuitries 150 may execute more than one instruction concurrently. The executed instructions can be cached in the executing circuitries 150. In addition, in instruction retiring circuitry 180, the instructions that have been executed by different execution circuitries 150 can also be cached in instruction retiring circuitry 180 to wait for final exits. In some embodiments, executing circuitries 150 and instruction retiring circuitry 180 can be referred to as a part of a back-end pipeline circuitry.

In some embodiments, instruction processing apparatus 100 or processor may have a plurality of cores, logical processors, or execution engines.

Speculative execution of instructions can be performed in instruction processing apparatus 100. In some embodiments, for a series of instructions to be executed in instruction processing apparatus 100, some instructions may be speculatively executed (e.g., execution according to speculations). In speculative execution, it is possible to assume that a certain speculative condition is correct, and read an instruction to be processed under the premise that the condition is correct. The instruction can then enter the pipeline, which can include reading, decoding, or executing of the instruction. In some embodiments, the instruction can also be retired when it is determined that the speculative condition is correct, so as to complete the execution of an instruction under a correct path.

In some embodiments, instructions can be a speculative execution instruction or a speculative condition determination instruction. The speculative execution instruction can be one or more instructions to be executed assuming that a speculative condition is correct, and the speculative condition determination instruction provides a determination of whether the speculative condition is correct during execution.

In some embodiments, speculative execution can include a branch jump. As a result, the speculative execution instruction may include some or all of the instructions under a certain jump branch, and the speculative condition determination instruction is a jump branch instruction. When the jump branch instruction is executed, a branch that is actually jumped to can be compared with a predicted jump branch. If they are the same, the speculative execution can be determined to be correct, and the processing of the speculative execution instruction can be determined to be appropriate. Therefore, execution results of some or all of the instructions under this jump branch can be submitted and the instructions can be exited. If the branch that is jumped to is different from the predicted jump branch, the speculation can be determined to be incorrect. Therefore, the processed speculative execution instruction can be discarded, and an instruction under a correct jump branch for execution can be read.

In some embodiments, when decoding circuitry 140 determines that the decoded instruction is a jump branch instruction, decoding circuitry 140 may predict, based on a historical execution record of the jump branch instruction, a branch to which the jump branch instruction is to jump. Subsequently, decoding circuitry 140 can instruct instruction fetching circuitry 130 to read some or all of the instructions under the branch path in advance and decodes them. Subsequently, decoding circuitry 140 can send the jump branch instruction and the related speculative execution instructions to scheduling circuitry 160, and scheduling circuitry 160 can schedule and transmit them to instruction executing circuitry 150 for execution.

In some embodiments, since scheduling circuitry 160 can perform out-of-sequence transmission and different types of instructions can be executed in different manners, some speculatively executed instructions may be executed first and wait for exit in instruction retiring circuitry 180. In some embodiments, executing circuitry 150 can include a branch jump circuitry for executing a jump branch instruction. When the jump branch instruction is executed in executing circuitry 150 (e.g., the jump branch instruction is executed in the branch jump circuitry), if a determination of the jump is the same as the prediction (e.g., jump to the same branch as the speculative execution does) after the jump branch instruction is executed and exited at instruction retiring circuitry 180, all speculative execution instructions, whether executed or not executed, can finish execution and exit. As a result, through speculative execution, instructions under a jump branch can be processed in advance, thereby improving the processing performance of a processor.

In some embodiments, when the execution result of the speculative condition determination instruction is that the speculative condition is incorrect (e.g., a speculation error occurs), it may be necessary to discard the speculative execution instructions that are currently being processed or have been processed, and read one or more instructions from a correct speculative condition for processing. For example, when the execution result of a jump branch instruction indicates that the previously predicted jump branch is incorrect, it may be necessary to discard the instruction in the currently processed branch path and read an instruction under a correct branch path.

Figure 2:
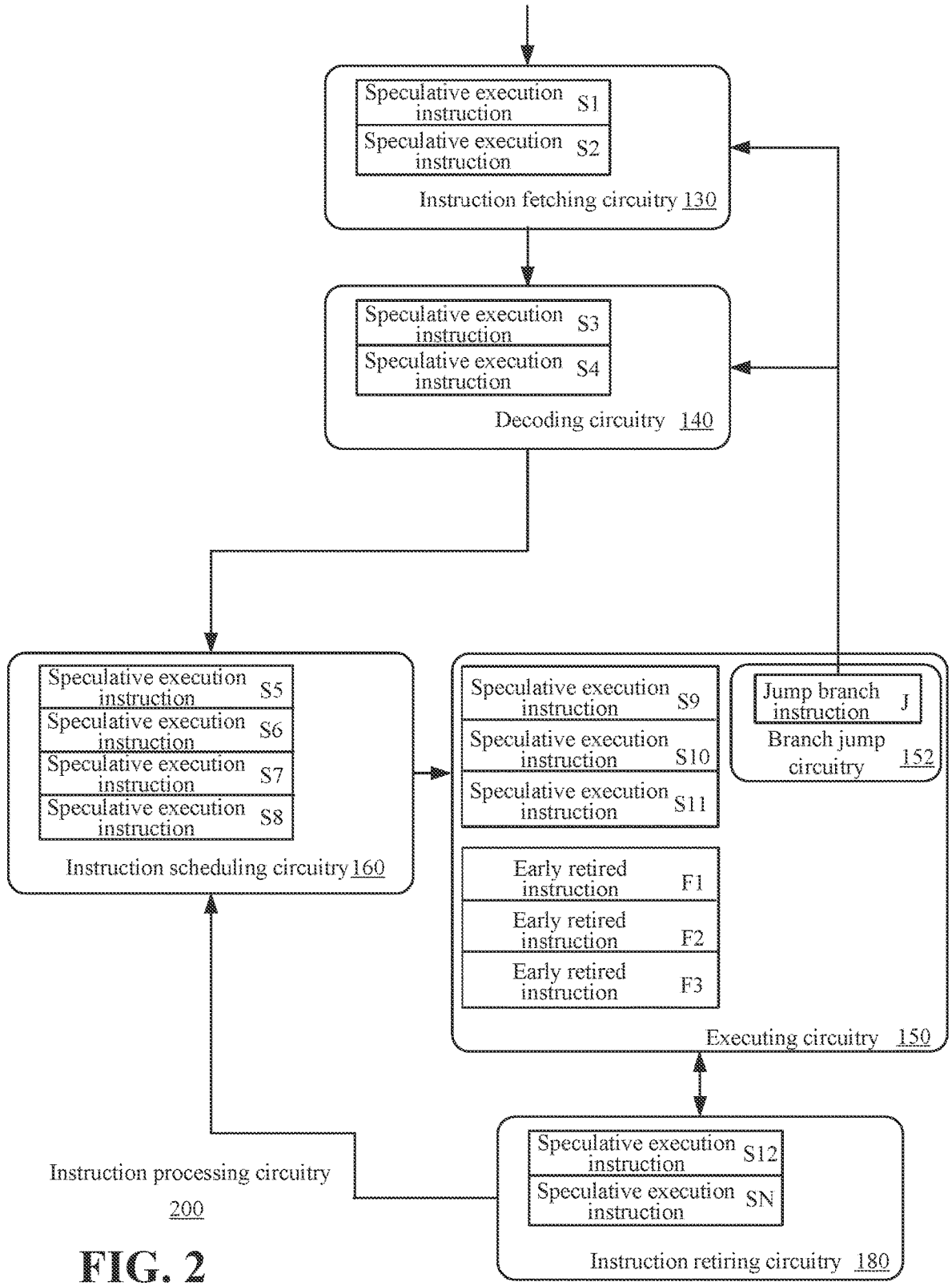
FIG. 2 is a schematic of an example instruction processing apparatus, according to some embodiments of the present disclosure.

FIG. 2 is a schematic of an example instruction processing apparatus, according to some embodiments of the present disclosure. As shown in FIG. 2, some or all parts of instruction processing apparatus 200 can be similar to some or all parts of instruction processing apparatus 100 shown in FIG. 1. For example, instruction processing apparatus 200 shown in FIG. 2 specifically describes relevant parts of processing in instruction processing apparatus 200 when a speculation is incorrect. In addition, it is appreciated that various components in various units or circuitries can be functionally divided, and they can be rearranged and combined for physical implementation without departing from the scope of protection of the present disclosure.

As shown in FIG. 2, the description is made by taking a speculative condition being a branch jump as an example. It is appreciated that the present disclosure is not limited to speculative execution based on branch jumps, and all manners of speculative execution based on speculative conditions fall within the scope of protection of the present disclosure.

As shown in FIG. 2, scheduling circuitry 160 can transmit instructions to one or more executing circuitries 150 for execution according to the instructions' types. For example, branch jump circuitry 152 in executing circuitry 150 can be configured to execute branch jump branch instruction J. In some embodiments, scheduling circuitry 160 can transmit speculative execution instructions S1-SN that are speculatively read based on a jump branch prediction of a jump branch. Speculative execution instructions S1-SN can be sent to one or more executing circuitries 150 for execution. Since the speculatively executed instructions are instructions under a jump branch, they may be distributed in different pipeline stages. As shown in FIG. 2, speculative execution instructions S1-S2 can be cached in instruction fetching circuitry 130. Instructions S3-S4 can be cached in decoding circuitry 140, Instructions S5-S8 can be cached and wait to be transmitted in the scheduling pipeline of instruction scheduling circuitry 160. Instructions S9-S11 can be executed in one or more executing circuitries 150. In addition, instructions S12-SN may have been executed and may wait in instruction retiring circuitry 180 to be retired if jump branch instruction J determines that the speculation is correct.

In some embodiments, there can be early retired instructions F1-F3. These instructions can be marked as submitted in instruction retiring circuitry 180 but have not yet been completely executed, so they may still be in execution in executing circuitry 150. In some embodiments, these instructions are older than jump branch instruction J. In some embodiments, if one instruction is older than another instruction, the old instruction needs to be processed before the new instruction. For example, if the instruction sequence is an assembly code list, the older instruction can be arranged before the new instruction and should be processed and retired first.

In some embodiments, when branch jump circuitry 152 executes jump branch instruction J, the branch to be jumped to may be determined to be different from the branch speculated in decoding circuitry 140 (e.g., a speculation error occurs) according to the execution result. As a result, the execution of speculative execution instructions S1-SN in instruction processing apparatus 100 or 200 may be indicated as incorrect. The execution results of these instructions may not be submitted or retired, and these instructions may be cleared from instruction processing apparatus 100.

In some embodiments, when branch jump circuitry 152 determines that the execution result of jump branch instruction J is inconsistent with the speculation result (e.g., a speculation error occurs), instruction fetching circuitry 130 and decoding circuitry 140 can be instructed to clear the instructions cached in instruction fetching circuitry 130 and instruction decoding circuitry 140 (e.g., instructions S1-S4). According to a correct branch determined by branch jump circuitry 152, one or more instructions under the correct path can be read and decoded. In some embodiments, since the speculative execution instructions in instruction scheduling circuitry 160 and the back-end pipeline circuitry have not been cleared, after decoding the one or more instructions under the correct path, decoding circuitry 140 can hold off on sending the decoded one or more instructions to scheduling circuitry 160 for instruction scheduling until instructions cached in instruction scheduling circuitry 160 or the back-end pipeline circuitry have been cleared.

In some embodiments, there can be jump nesting or other nesting structures. As a result, jump branch instruction J that is currently determined to be incorrectly predicted may not be the oldest jump branch instruction for which a prediction is incorrect, and the current speculative execution instruction corresponds to the oldest jump branch instruction. Therefore, the corresponding speculative execution instruction should be cleared when a prediction for the instruction is incorrect. In some embodiments, before issuing an instruction clearing instruction to the front-end pipeline circuitry (e.g., instruction fetching circuitry 130 and decoding circuitry 140), branch jump circuitry 152 determines whether jump branch instruction J is the oldest jump branch instruction for which a prediction is incorrect.

In some embodiments, branch jump circuitry 152 can record some of the older instructions (e.g., the oldest instruction) for which a prediction is incorrect. When branch jump circuitry 152 detects that an execution result of instruction J indicates a branch prediction error while executing jump branch instruction J, branch jump circuitry 152 can compare instruction J with the instruction recorded in branch jump circuitry 152. If the recorded instruction is older, it indicates that a notification or indication of a prediction error has been issued, and no notification may be issued again. If instruction J is older or does not have a previous prediction failure record, instruction J can be recorded in branch jump circuitry 152 or the previously recorded instruction is replaced with instruction J, and a notification is issued or the front-end pipeline circuitry (e.g., instruction fetching circuitry 130 and decoding circuitry 140) is instructed to clear the instructions. Subsequently, the execution of jump branch instruction J can be completed, and the instruction can be sent to instruction retiring circuitry 180 for retirement processing.

In some embodiments, although the instructions can be executed out of order in executing circuitries 150, they can be sequentially retired (e.g., in order) in retiring circuitry 180. As a result, when jump branch instruction J is retired in retiring circuitry 180, instructions older than instruction J can be indicated to have been transmitted to and executed in executing circuitries 150 and have not been retired except for early retired instructions. Therefore, when instruction J is retired, retiring circuitry 180 can instruct instruction scheduling circuitry 160 to clear the instructions on the scheduling pipeline circuitry (e.g., clear instructions S5-S8).

In some embodiments, the system can wait for the execution of the early retired instructions (e.g., instructions F1-F3) to be completed. When the execution of these instructions is completed, there may not be any instruction older than instruction branch J in the current back-end pipeline circuitry (e.g., executing circuitry 150 and retiring circuitry 180). In some embodiments, retiring circuitry 180 can instruct the back-end pipeline circuitry to clear the instructions in the back-end pipeline circuitry (e.g., instructions S9-SN). For example, retiring circuitry 180 can instruct executing circuitries 150 to clear instructions S9-S11 being executed and clears instructions S12-SN in retiring circuitry 180.

In some embodiments, after the instructions in the back-end pipeline circuitry are cleared, the instructions under a correct path corresponding to the actual jump branch can be read and decoded in the front-end pipeline circuitry and sent to scheduling circuitry 160 and transmitted to different executing circuitries 150 for execution.

In some embodiments, the processor pipeline can be divided into three parts, namely a front-end pipeline circuitry related to instruction fetching and instruction decoding, a scheduling pipeline circuitry for transmitting instructions out of order to a back-end pipeline circuitry, and the back-end pipeline circuitry related to instruction execution and retirement. When an error occurs in speculative execution of instructions, the front-end pipeline circuitry can be cleared, and reading and decoding of instructions under a correct path can start. The scheduling pipeline circuitry and the back-end pipeline circuitry can also be gradually cleared with the execution of a speculative condition determination instruction, thereby reducing the processing time of the instructions under the correct path in the entire pipeline and improving the processing performance.

In some embodiments, characteristics of sequential exiting and out-of-order execution of instructions can be fully considered. For example, a new instruction can be read and decoded in the front-end pipeline circuitry before the back-end pipeline circuitry is cleared. After all related instructions exit sequentially, the instruction that has already been in the front-end pipeline circuitry can be scheduled by the scheduling pipeline circuitry for execution, thereby improving the processing performance.

In some embodiments, after the speculative condition determination instruction exits, there may be an early retired instruction being executed. Therefore, the back-end pipeline circuitry may be cleared only after the execution of the early retired instruction is completed, thereby making this solution applicable to existing pipeline designs that support early retirement.

Figure 3:
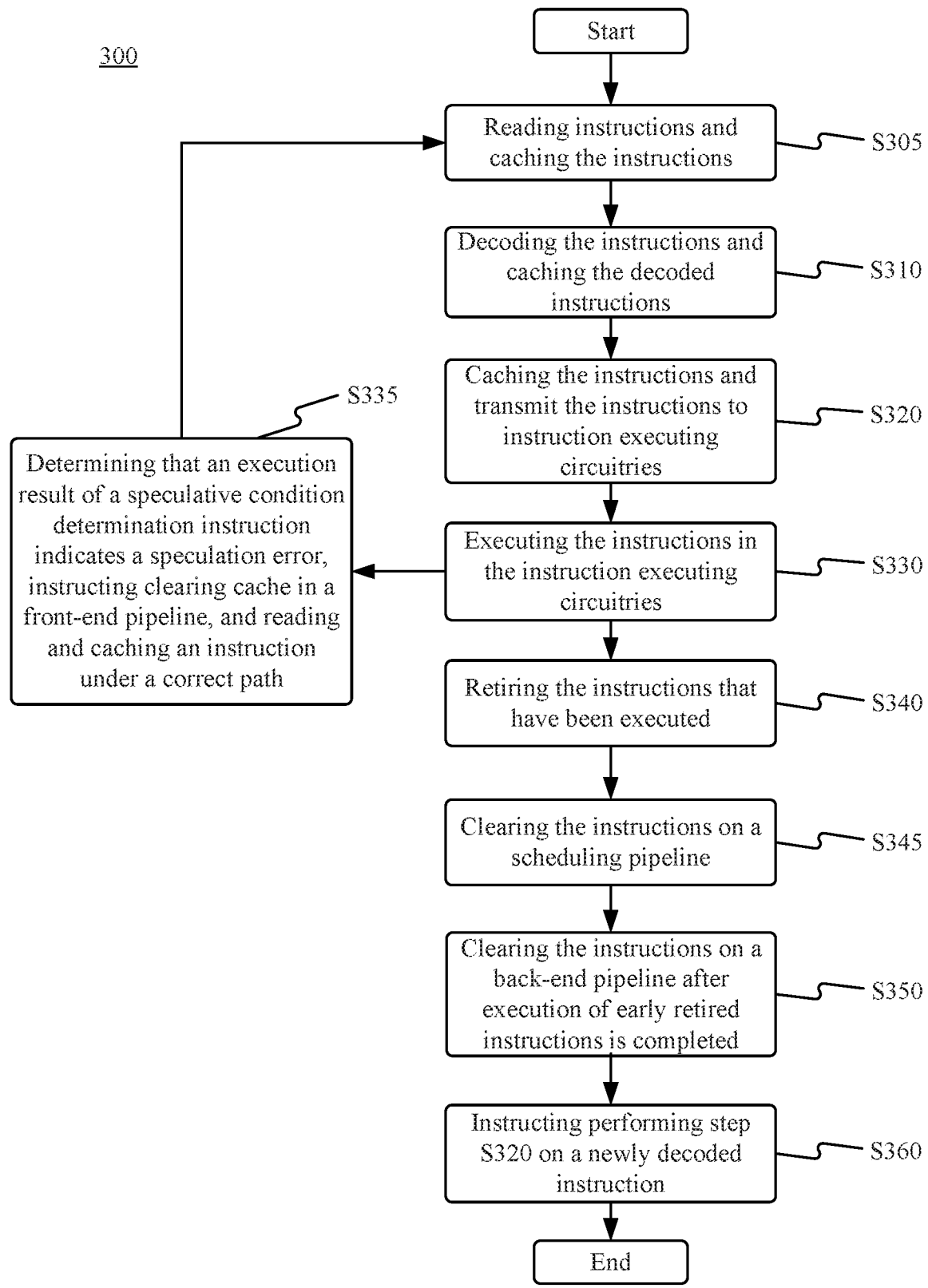
FIG. 3 is a flowchart of an example instruction processing method, according to some embodiments of the present disclosure.

FIG. 3 is a flowchart of an example instruction processing method, according to some embodiments of the present disclosure. It is appreciated that instruction processing method 300 can be performed in instruction processing apparatus 100 of FIG. 1 or instruction processing apparatus of FIG. 2. As shown in FIG. 3, instruction processing method 300 can start from step S305.

In step S305, instructions are read and cached. In some embodiments, instructions can be read and cached by an instruction fetching circuitry (e.g., instruction fetching circuitry 130 of FIG. 1 or FIG. 2).

In step S310, the read instructions are decoded, and the decoded instructions are cached. In some embodiments, the instructions are decoded and cached by decoding circuitry (e.g., decoding circuitry 140 of FIG. 1 and FIG. 2). For example, for a series of instructions to be executed in instruction processing apparatus 100 or 200, some instructions can be speculatively executed. In the speculative execution, it is possible to assume that a certain speculative condition is correct. As a result, based on the assumed speculative condition, a new instruction corresponding to the speculative condition can be read. The new instruction can be read, decoded, and executed in the pipeline of a processor, and retired when it can be confirmed that the speculative condition is correct. As a result, the instruction may be considered to have been executed and completed under a correct path. Therefore, the instructions to be read and decoded can include a speculative execution instruction and a speculative condition determination instruction. The speculative execution instruction can be one or more instructions to be executed when a speculative condition is assumed to be correct, and the speculative condition determination instruction provides a determination of whether the speculative condition is correct during execution.

In some embodiments, speculative execution includes a branch jump. In this case, the speculative execution instruction can include all instructions under a jump branch of the branch jump, and the speculative condition determination instruction can be a jump branch instruction of the branch jump. When the jump branch instruction is executed, a branch to be actually jumped to can be compared with a predicted jump branch. If they are the same, the speculative execution can be determined to be correct, and the processing of the speculative execution instruction can be determined to be appropriate or correct. As a result, execution results of the instructions under this jump branch can be retired and the instructions can exit. If they are different, the speculation is determined to be incorrect. Therefore, the processed speculative execution instruction may be discarded and one or more instructions under a correct jump branch can be read for execution.

It is appreciated that method 300 can be applied by taking a branch jump being a speculative condition. It is appreciated that the present disclosure is not limited to the speculative execution being based on branch jumps, and all manners of speculative execution based on speculative conditions fall within the scope of protection of the present disclosure.

In some embodiments, in method 300, the instructions are processed in a pipelined manner. For example, in step S320, instructions decoded in step S310 can be received and cached. In some embodiments, the instructions can be received and cached at the instruction scheduling circuitry (e.g., instruction scheduling circuitry 160 of FIG. 1 and FIG. 2), and the received instructions can be transmitted to the executing circuitry (e.g., executing circuitry 150 of FIG. 1 and FIG. 2) for execution. In step S330, the instruction executing circuitry receives the instructions transmitted from the instruction scheduling circuitry in step S320 and executes the instructions. In step S340, the instructions executed by the instruction executing circuitry in step S330 can be cached in an instruction retiring circuitry (e.g., instruction retiring circuitry 180 of FIG. 1 and FIG. 2), and these instructions may be retired.

In some embodiments, if the decoded instruction from step S310 is determined to be a jump branch instruction, a branch to which the jump branch instruction is to jump can be predicted according to a historical execution record of the jump branch instruction. Subsequently, it can be instructed, in step S305, to read one or more instructions under the branch path, and send the one or more instructions to step S310 for decoding. In some embodiments, instructions under the branch path can be referred to as speculative execution instructions or opportunistic execution instructions.

In some embodiments, when an instruction is to be executed in step S330, if the instruction to be executed is a jump branch instruction, a branch jump circuitry (e.g., branch jump circuitry 152 of FIG. 2) can be used to execute the instruction. When the branch jump circuitry executes jump branch instruction J, an execution result can be obtained, and it can be determined based on the execution result if the branch to be jumped to is different from the branch speculated in step S310. If it is determined according to the execution result that a branch to be jumped to is different from the branch speculated in step S310, a speculation error occurs. As a result, the processing of speculatively executed instructions in this method can be determined to be incorrect. Execution results of these instructions may not be retired, and these instructions may be cleared from instruction processing apparatus 100 or 200.

In some embodiments, method 300 further includes step S335. When it is determined that the execution result of jump branch instruction J is inconsistent with the speculative result and a speculation error occurs, the instructions cached in steps S305 and S310 can be cleared. In addition, according to a correct branch determined by the branch jump circuitry, it is instructed that instructions under a correct path can be read in step S305 and decoded in step S310. In some embodiments, since the speculatively executed instructions in the instruction scheduling circuitry and the back-end pipeline circuitry have not been cleared, after the instructions under the correct path are decoded in step S310, sending the decoded instructions to the scheduling circuitry for instruction scheduling in step S320 may not be executed until the speculatively executed instructions are cleared.

In some embodiments, there can be jump nesting or other nesting structures. As a result, jump branch instruction J that is currently determined to be incorrectly predicted may not be the oldest jump branch instruction for which a prediction is incorrect, and the current speculative execution instruction may correspond to the oldest jump branch instruction. Therefore, the corresponding speculative execution instruction can be cleared when a prediction for the instruction is incorrect. In some embodiments, before issuing an instruction clearing instruction to the front-end pipeline circuitry in step S335, the branch jump circuitry determines whether jump branch instruction J is the oldest jump branch instruction for which a prediction is incorrect.

In some embodiments, the branch jump circuit can record some of the older instructions (e.g., the oldest instruction) for which a prediction is incorrect. When the branch jump circuitry detects that an execution result of instruction J indicates a branch prediction error while executing jump branch instruction J, the branch jump circuitry can compare instruction J with the instruction recorded in the branch jump circuitry. If the recorded instruction is older, it indicates that a notification or indication of a prediction error has been issued, and no notification may be issued again. If instruction J is older or does not have a previous prediction failure record, instruction J can be recorded in branch jump circuitry or the previously recorded instruction can be replaced with instruction J, and a notification can be issued to indicate a prediction error or the front-end pipeline circuitry is instructed to clear the instructions.

Subsequently, the execution of jump branch instruction J can be completed in step S330, and the method proceeds to step S340 in which jump branch instruction J can be cached and retired.

In some embodiments, although the instructions can be executed out of order in the executing circuitries, they can be sequentially retired (e.g., in order) in step S340. As a result, when jump branch instruction J is retired, instructions older than instruction J can be indicated to have been transmitted to and executed in the executing circuitries and have not been retired except for early retired instructions. In some embodiments, method 300 can further include step S345. In step S345, when instruction J is retired, the scheduling circuitry can be instructed to clear the instructions on the scheduling pipeline. In some embodiments, method 300 can further include step S350. In step S350, the system can wait for the execution of the early retired instructions to be completed. After the execution of these instructions is completed, there may not be any instruction older than jump branch instruction J in the current back-end pipeline circuitry. In some embodiments, in step S350, the retiring circuitry can instruct to clear the instructions in the back-end pipeline circuitry. For example, the instruction executing circuitry and the retiring circuitry can be instructed to clear the instructions being executed and clear the instructions currently in retirement.

In step S360, after the instructions in the back-end pipeline circuitry are cleared, the instructions under the correct path corresponding to the actual jump branch can be read and decoded in the front-end pipeline circuitry in steps S305 and S310 and can be sent to the scheduling circuitry, so as to perform step S320 to transmit the instructions to various executing circuitries for execution.

In some embodiments, the processor pipeline can be divided into three parts, namely a front-end pipeline circuitry related to instruction fetching and instruction decoding, a scheduling pipeline circuitry for transmitting instructions out of order to a back-end pipeline circuitry, and the back-end pipeline circuitry related to instruction execution and retirement. When an error occurs in speculative execution of instructions, the front-end pipeline circuitry can be cleared, and reading and decoding of instructions under a correct path can start. The scheduling pipeline circuitry and the back-end pipeline circuitry can also be gradually cleared with the execution of a speculative condition determination instruction, thereby reducing the processing time of the instructions under the correct path in the entire pipeline and improving the processing performance.

It is appreciated that the instruction processing apparatuses (e.g., instruction processing apparatus 100 of FIG. 1 and FIG. 2) according to the present disclosure may be implemented as a processor core, and the instruction processing methods (e.g., method 300 of FIG. 3) may be executed in the processor core. In some embodiments, the processor core may be implemented in different processors in different manners. For example, the processor core may be implemented as a general ordered core for general computing, a high-performance general unordered core for general computing, or a dedicated core for graphics or scientific (throughput) computing. The processor may be implemented as a Central Processing Unit ("CPU") or co-processor, where the CPU may include one or more general ordered cores or one or more general unordered cores, and the co-processor may include one or more dedicated cores. Such a combination of different processors may lead to different computer system architectures. In some embodiments, the co-processor can be located on a chip separate from the CPU. In some embodiments, the co-processor is located in the same package as the CPU but on a separate die. In some embodiments, the co-processor is located on the same die as the CPU. Such a co-processor can sometimes be referred to as dedicated logic such as integrated graphics or scientific (throughput) logic, or referred to as a dedicated core. In some embodiments, the computer system architecture is a system-on-chip, the described CPU (sometimes referred to as an application core or application processor), the co-processor described above, and additional functions may be included on the same die.

Figure 4:
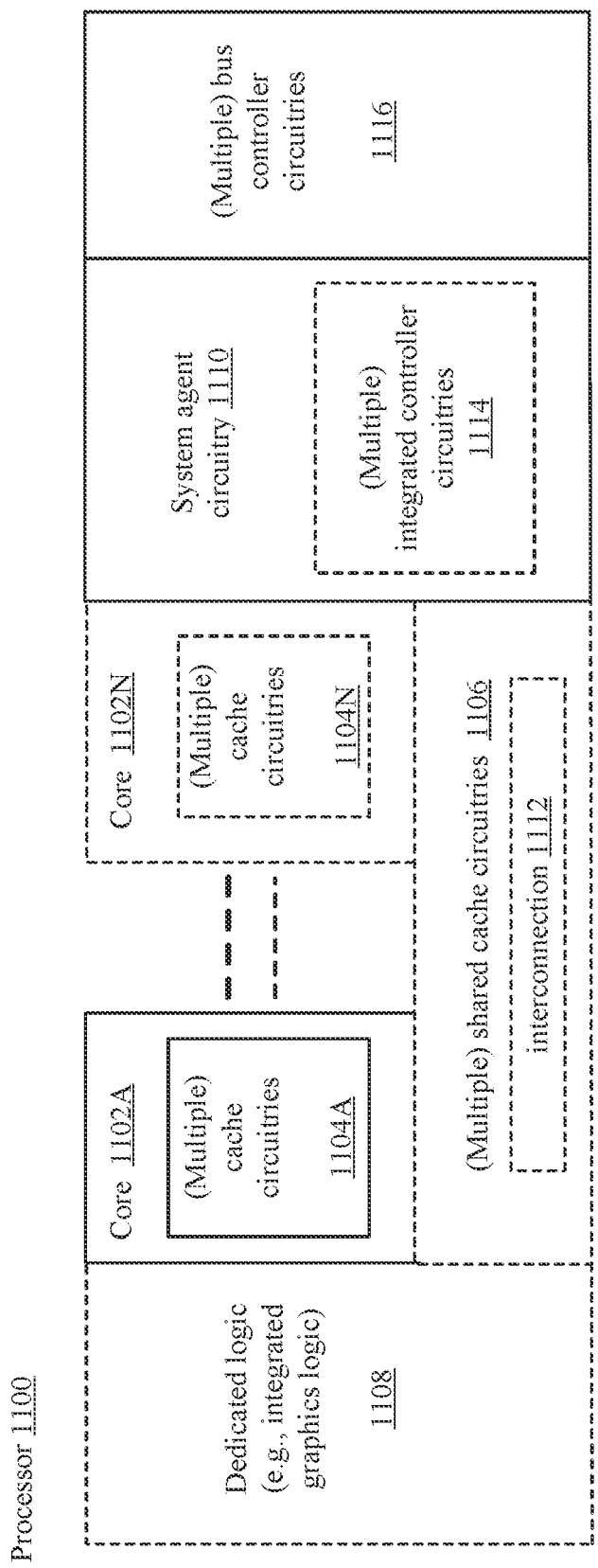
FIG. 4 is a schematic of an example processor, according to some embodiments of the present disclosure.

FIG. 4 is a schematic of an example processor, according to some embodiments of the present disclosure. In some embodiments, as shown in FIG. 4, processor 1110 can include single core 1102A, system agent circuitry 1110, and one or more bus controller circuitries 1116. In some embodiments, as shown by the dotted box in FIG. 4, processor 1100 may further include a plurality of cores 1102A-N, one or more integrated memory controller circuitries 1114 in system agent circuitry 1110, and dedicated logic 1108.

In some embodiments, processor 1100 may be implemented as a CPU, wherein dedicated logic 1108 can be the integrated graphics or scientific (throughput) logic that may include one or more cores. Cores 1102A-N can be one or more general cores (e.g., a general ordered core, a general unordered core, and a combination of both). In some embodiments, processor 1100 may be implemented as a co-processor, wherein cores 1102A-N can be a plurality of dedicated cores for graphics or scientific (throughput) logic processing. In some embodiments, processor 1100 may be implemented as a co-processor, and cores 1102A-N can be a plurality of general ordered cores. Therefore, processor 1100 may be a general processor, a co-processor, a dedicated processor, a network or communication processor, a compression engine, a graphics processor, a general-purpose graphics processing unit ("GPGPU"), a high-throughput many integrated core ("MIC") co-processor (e.g., including 30 or more cores), or an embedded processor. In some embodiments, the processor may be implemented on one or more chips. In some embodiments, processor 1100 may be part of one or more substrates, or may be implemented on one or more substrates using any of a plurality of processing techniques such as BiCMOS, CMOS, or NMOS.

In some embodiments, a memory hierarchical structure can include one or more levels of cache within each core (cache units 1104A-N), one or more shared cache circuitries 1106, or an external memory (not shown) communicatively coupled to integrated memory controller circuitry 1114. Shared cache circuitries 1106 may include one or more intermediate level caches, such as level 2 ("L2"), level 3 ("L3"), level 4 ("L4"), or other levels of cache such as last level cache ("LLC"), or combinations thereof. In some embodiments, one or more shared cache circuitries 1106 can include interconnection 1112. In some embodiments, interconnection 1112 is a ring-based interconnection. In some embodiments, interconnection 1112 can interconnect integrated graphics logic 1108, one or more shared cache circuitries 1106, or system agent circuitry 1110.

In some embodiments, system agent circuitry 1110 can include those components that coordinate with cores 1102A-N. For example, system agent circuitry 1110 may include a power control unit ("PCU") including circuitries and a display circuitry. The PCU may include logic and components that are needed to adjust power states of cores 1102A-N and integrated graphics logic 1108. The display circuitry can be configured to drive one or more externally connected displays.

In some embodiments, cores 1102A-N may have the core architecture described above with reference to FIG. 1 and may be homogeneous or heterogeneous in terms of architectural instruction set. For example, two or more of cores 1102A-N may be able to execute the same instruction set, while other cores may be able to execute only a subset of the instruction set or a different instruction set.

Figure 5:
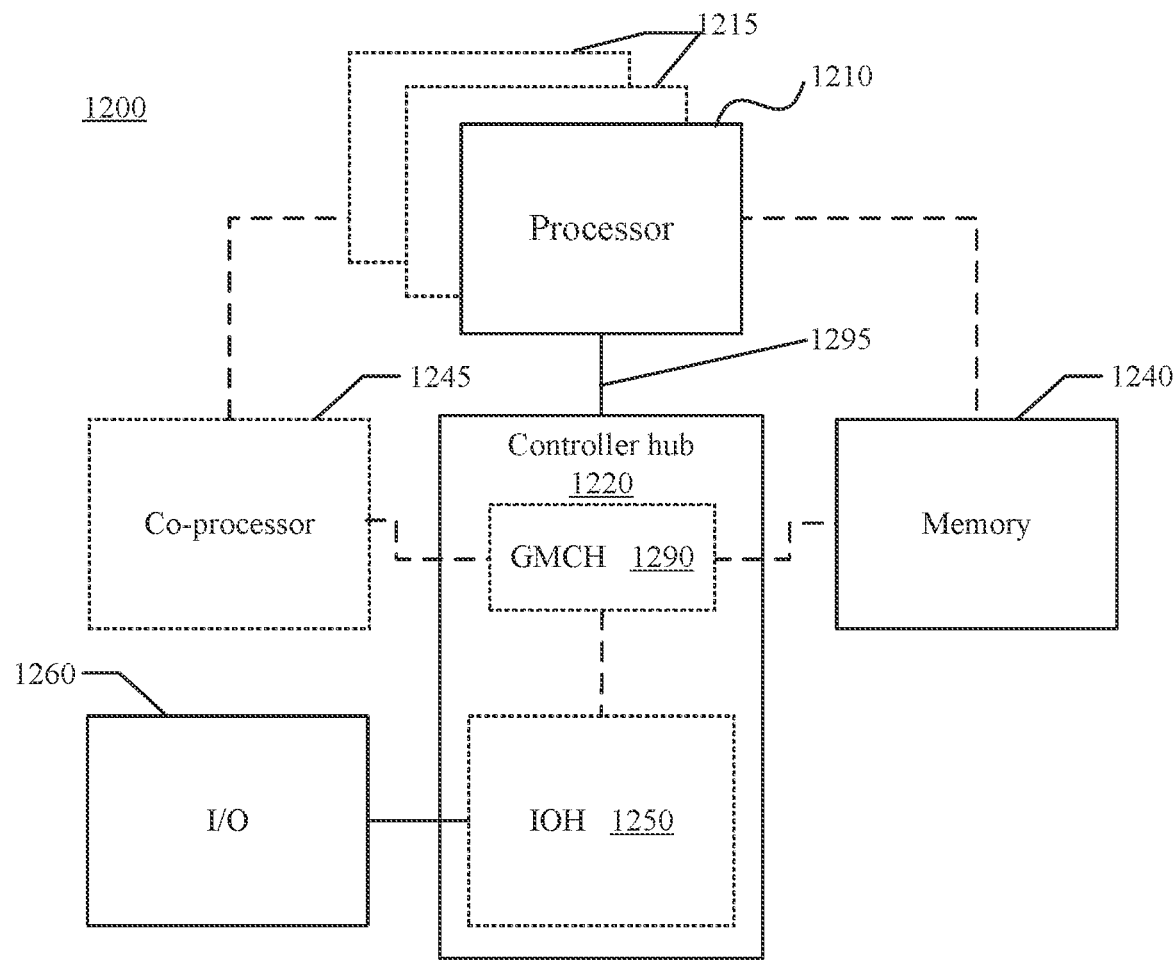
FIG. 5 is a schematic of an example computer system, according to some embodiments of the present disclosure.

FIG. 5 is a schematic of an example computer system, according to some embodiments of the present disclosure.

As shown in FIG. 5, it is appreciated that computer system 1200 may be applied to a laptop device, a desktop computer, a handheld PC, a personal digital assistant, an engineering workstation, a server, a network device, a network hub, a switch, an embedded processor, a digital signal processor ("DSP"), a graphic device, a video game device, a set-top box, a microcontroller, a cellular phone, a portable media player, a handheld device, and various other electronic devices. It is appreciated that the present disclosure is not limited thereto, and all systems that can incorporate the processor or other execution logic disclosed in this specification fall within the scope of protection of the present disclosure.

As shown in FIG. 5, system 1200 may include one or more processors 1210, and 1215. These processors can be communicatively coupled to controller hub 1220. In some embodiments, controller hub 1220 includes graphics memory controller hub ("GMCH") 1290 or input/output hub ("IOH") 1250 which may be located on separate chips. In some embodiments, GMCH 1290 can include a memory controller or a graphics controller communicatively coupled to memory 1240 or co-processor 1245. In some embodiments, IOH 1250 can communicatively couple input/output ("I/O") device 1260 to GMCH 1290. In some embodiments, the memory controller and the graphics controller can be integrated in the processor, so that memory 1240 and co-processor 1245 can be communicatively coupled to processor 1210. In some embodiments, controller hub 1220 includes IOH 1250 only.

In some embodiments, as shown in dashed lines in FIG. 5, processors 1210 and 1215 may include one or more of the processing cores, and may be a certain version of processor 1100 shown in FIG. 4.

In some embodiments, memory 1240 may be, for example, a dynamic random access memory ("DRAM"), a phase change memory ("PCM"), or a combination of both. In some embodiments, controller hub 1220 communicates with processors 1210 and 1215 via a multi-drop bus such as a front side bus ("FSB"), a point-to-point interface such as quick path interconnect ("QPI"), or a similar connection 1295.

In some embodiments, co-processor 1245 is a dedicated processor. For example, co-processor 1245 can be a high-throughput MIC processor, a network or communication processor, a compression engine, a graphics processor, a GPGPU, or an embedded processor. In some embodiments, controller hub 1220 may include an integrated graphics accelerator.

In some embodiments, processor 1210 can execute instructions that control data processing operations of general types. Embedded in these instructions may be co-processor instructions. Processor 1210 can identify these co-processor instructions as having the type that should be executed by the attached co-processor 1245. Therefore, processor 1210 can issue these co-processor instructions (or control signals representing coprocessor instructions) to co-processor 1245 on the co-processor bus or another interconnect. Co-processor 1245 can accept and execute the received co-processor instructions.

Figure 6:
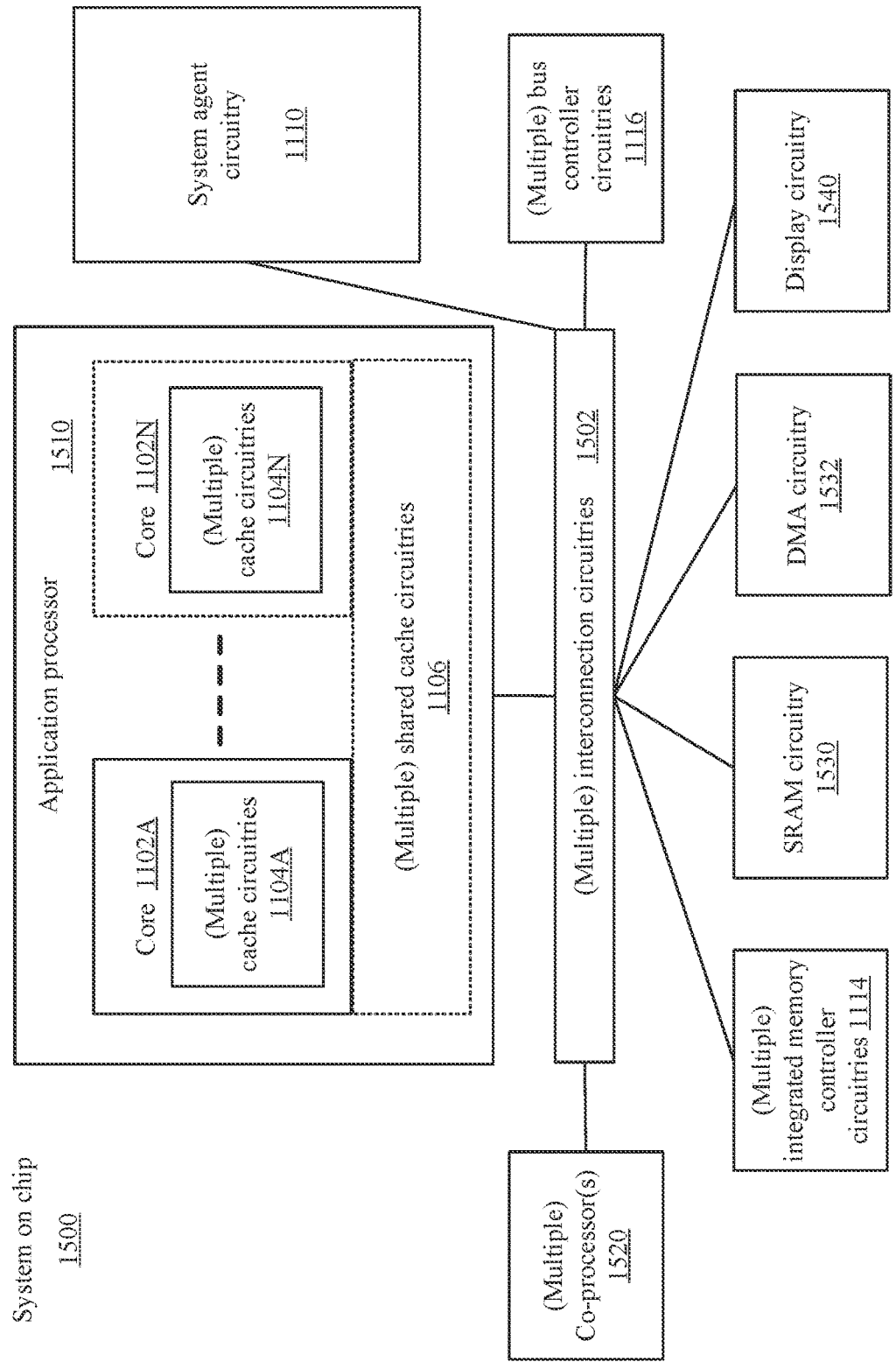
FIG. 6 is a schematic of an example system-on-chip, according to some embodiments of the present disclosure.

FIG. 6 is a schematic of an example system-on-chip, according to some embodiments of the present disclosure. It is appreciated that system-on-chip ("SoC") 1500 shown in FIG. 6 can include processor 1100 shown in FIG. 4 and the components similar to those in FIG. 4. As shown in FIG. 6, interconnection circuitry 1502 can be communicatively coupled to application processor 1510, system agent circuitry 1110, bus controller circuitry 1116, integrated memory controller circuitry 1114, one or more co-processors 1520, static random access memory ("SRAM") circuitry 1530, direct memory access ("DMA") circuitry 1532, and display circuitry 1540. Display circuitry 1540 can be configured to be communicatively coupled to one or more external displays. In some embodiments, application processor 1510 can include a set of one or more cores 1102A-N or shared cache circuitry 1106. In some embodiments, co-processor 1520 can include integrated graphics logic, an image processor, an audio processor, or a video processor. In some embodiments, co-processor 1520 can include a dedicated processor (e.g., a network or communication processor), a compression engine, a GPGPU, a high-throughput MIC processor, or an embedded processor.

In some embodiments, system-on-chip 1500 may be included in an intelligent device in order to realize corresponding functions in the intelligent device. The functions can include executing related control programs, performing data analysis, operation and processing, network communication, controlling peripheral devices in the intelligent device, etc.

In some embodiments, such intelligent devices can include specialized intelligent devices, such as mobile terminals and personal digital terminals. These devices can include one or more systems-on-chip (e.g., system on chip 1500 of FIG. 6) according to the present disclosure to perform data processing or control peripheral devices in the device.

In some embodiments, such intelligent devices can also include dedicated devices constructed to achieve specific functions, such as intelligent speakers and intelligent display devices. These devices include the system-on-chip (e.g., system on chip 1500 of FIG. 6) according to the present disclosure to control the speaker and the display device, thereby giving the speaker and the display device additional functions such as communication, perception, and data processing.

In some embodiments, such intelligent devices also include various IoT and AIoT devices. These devices include the system-on-chip (e.g., system on chip 1500 of FIG. 6) according to the present disclosure for data processing (e.g., performing AI operations), data communication and transmission, etc., thereby achieving a denser and more intelligent device distribution.

In some embodiments, such intelligent devices can also be used in vehicles. For example, they may be implemented as in-vehicle devices or may be embedded in vehicles to provide data processing capabilities for intelligent driving of the vehicles.

In some embodiments, such intelligent devices may also be used in the home and entertainment fields. For example, they may be implemented as intelligent speakers, intelligent air conditioners, intelligent refrigerators, intelligent display devices, etc. These devices include the system-on-chip (e.g., system on chip 1500 of FIG. 6) according to the present disclosure for data processing and peripheral control, thereby realizing intelligentization of home and entertainment devices.

In some embodiments, such intelligent devices can also be used in industrial fields. For example, they may be implemented as industrial control devices, sensing devices, IoT devices, AIoT devices, and braking devices. These devices can include the system-on-chip (e.g., system on chip 1500 of FIG. 6) according to the present disclosure for data processing and peripheral control, thereby realizing intelligentization of industrial equipment.

In various example embodiments described herein are described in the general context of method steps or processes, which may be implemented in one aspect by a computer program product, embodied in a computer-readable medium, including computer-executable instructions, such as program code, executed by computers to program the processors. A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

According to embodiments of the present disclosure, the entire processor pipeline can be divided into three parts, namely, a front-end pipeline circuitry related to instruction fetching and instruction decoding, a scheduling pipeline circuitry for transmitting instructions out of order to a back-end pipeline circuitry, and the back-end pipeline circuitry related to instruction execution and retirement. Subsequently, when a speculative condition for speculative execution of instructions is false, the front-end pipeline circuitry is cleared immediately, reading and decoding of instructions under a correct path starts, and then the scheduling pipeline circuitry and the back-end pipeline circuitry are gradually cleared with the execution of a speculative condition determination instruction, thereby reducing the processing time of instructions under the correct path in the entire pipeline and improving the processing performance.

The embodiments may further be described using the following clauses:

1. An instruction processing apparatus, comprising:
an instruction fetching circuitry configured to:
read a set of instructions, wherein the set of instructions comprises a speculative execution instruction and a speculative condition determination instruction, and the speculative execution instruction is an instruction to be executed according to a speculative condition of the speculative condition determination instruction;
cache one or more instructions of the set of instructions in the instruction fetching circuitry;
in response to a determination that the speculative condition determination instruction has been read, read the speculative execution instruction corresponding to the speculative condition of the speculative condition determination instruction, and
in response to a determination that an execution result of the speculative condition determination instruction indicates that the speculative condition is incorrect, clear the one or more instructions cached in the instruction fetching circuitry;
an instruction decoding circuitry configured to decode the set of instructions;
an executing circuitry configured to execute the one or more instructions of the set of instructions, wherein the operation of executing the one or more instructions comprises executing the speculative condition determination instruction to obtain the execution result; and
an instruction retiring circuitry configured to:
cache in the instruction retiring circuitry the one or more instructions of the set of instructions executed by the executing circuitry; and
in response to an instruction older than the speculative condition determination instruction being retired, instruct the executing circuitry to clear the instructions being executed in the executing circuitry and clear the instructions cached in the instruction retiring circuitry.

2. The instruction processing apparatus according to clause 1, further comprising:
an instruction scheduling circuitry configured to:
receive one or more instructions of the set of instructions from the instruction decoding circuitry;
transmit one or more instructions of the set of instructions to the execution circuitry for execution;
cache one or more instructions of the set of instructions in the instruction scheduling circuitry; and
clear the one or more instructions cached in the instruction scheduling circuitry in response to the speculative condition determination instruction being retired.

3. The instruction processing apparatus according to clause 2, wherein:
the instruction fetching circuitry is further configured to sequentially read the one or more instructions of the set of instructions;
the instruction scheduling circuitry is further configured to transmit the one or more instructions of the set of instructions out of order to the executing circuitry for execution; and
the instruction retiring circuitry is further configured to sequentially retire the one or more instructions that have been executed by the executing circuitry.

4. The instruction processing apparatus according to clause 3, wherein the instruction fetching circuitry is further configured to, in response to a determination that the speculative condition is incorrect, read an instruction from a correct speculative condition and cache the instruction.

5. The instruction processing apparatus according to clause 4, wherein the instruction decoding circuitry is further configured to hold off on sending to the instruction scheduling circuitry the instruction read in response to the determination that the speculative condition is incorrect until the one or more instructions cached in the executing circuitry are cleared.

6. The instruction processing apparatus according to any one of clauses 1-5, wherein the executing circuitry is further configured to:
determine whether the speculative condition determination instruction indicated as incorrect by the execution result is the oldest speculative condition determination instruction having an incorrect execution result.

7. The instruction processing apparatus according to clause 6, wherein the executing circuitry is further configured to:
compare the speculative condition determination instruction having the incorrect result with a recorded speculative condition determination instruction having an incorrect result; and
in response to a determination that the speculative condition determination instruction is older than the recorded speculative condition determination instruction, the instruction fetching circuitry is further configured to replace the recorded speculative condition determination instruction with the speculative condition determination instruction and clear the one or more instructions cached in the instruction fetching circuitry.

8. The instruction processing apparatus according to any one of clauses 1-7, wherein the speculative condition is a jump branch prediction, the speculative condition determination instruction is a jump branch instruction, and the instruction decoding circuitry is further configured to set a predicted jump branch as the speculative condition according to a historical jump record of the jump branch instruction.

9. The instruction processing apparatus according to clause 8, wherein the executing circuitry comprises a branch jump circuitry configured to:
execute the jump branch instruction, and
record an oldest instruction for which a jump branch prediction is incorrect.

10. An instruction processing method, comprising:
reading a set of instructions, wherein the set of instructions comprises a speculative execution instruction and a speculative condition determination instruction, and the speculative execution instruction is an instruction to be executed according to a speculative condition of the speculative condition determination instruction;
caching one or more instructions of the set of instructions in an instruction fetching circuitry; in response to a determination that the speculative condition determination instruction has been read, reading the speculative execution instruction corresponding to the speculative condition of the speculative condition determination instruction;
decoding the set of instructions by an instruction decoding circuitry;
executing the one or more instructions by an executing circuitry, wherein executing the one or more instructions by the executing circuitry comprises executing the speculative condition determination instruction to obtain an execution result;
in response to a determination that the execution result of the speculative condition determination instruction indicates that the speculative condition is incorrect, clear the one or more instructions cached in the instruction fetching circuitry
caching in an instruction retiring circuitry the one or more instructions of the set of instructions executed by the executing circuitry; and
in response to an instruction older than the speculative condition determination instruction being retired:
clearing the instructions being executed in the executing circuitry, and
clearing the instructions cached in the instruction retiring circuitry.

11. The instruction processing method according to clause 10, further comprising:
receiving, by an instruction scheduling circuitry one or more instructions of the set of instructions from the instruction decoding circuitry;
caching one or more instructions of the set of instructions in the instruction scheduling circuitry; and
transmitting, by the instruction scheduling circuitry, one or more instructions of the set of instructions for execution;
clearing the one or more instructions cached in the instruction scheduling circuitry in response to the speculative condition determination instruction being retired.

12. The instruction processing method according to clause 11, wherein:
reading a set of instructions comprises sequentially reading the set of instructions;
transmitting, by the instruction scheduling circuitry, one or more instructions of the set of instructions for execution further comprise transmitting, by the instruction scheduling circuitry, the one or more instructions out of order for execution; and
the method further comprises sequentially retiring the one or more instructions that have been executed.

13. The instruction processing method according to clause 11, further comprising:
in response to a determination that the speculative condition is incorrect, reading an instruction from a correct speculative condition and caching the instruction.

14. The instruction processing method according to clause 13, further comprising:
holding off on sending to the instruction scheduling circuitry the instruction read in response to the determination that the speculative condition is incorrect until the one or more instructions cached in the executing circuitry are cleared.

15. The instruction processing method according to any one of clauses 10-14, further comprising:
determining whether the speculative condition determination instruction indicated as incorrect by the execution result is the oldest speculative condition determination instruction having an incorrect execution result.

16. The instruction processing method according to clause 15, wherein determining whether the speculative condition determination instruction is the oldest speculative condition determination instruction comprises:
comparing the speculative condition determination instruction having the incorrect result with a recorded speculative condition determination instruction having an incorrect result; and
in response to a determination that the speculative condition determination instruction is older than the recorded speculative condition determination instruction:
replacing the recorded speculative condition determination instruction with the speculative condition determination instruction, and
determining the speculative condition determination instruction as the oldest speculative condition determination instruction.

17. The instruction processing method according to any one of clauses 10-16, wherein the speculative condition is a jump branch prediction, the speculative condition determination instruction is a jump branch instruction, and reading a set of instructions comprises:
setting a predicted jump branch as the speculative condition according to a historical jump record of the jump branch instruction.

18. The instruction processing method according to clause 17, wherein executing the speculative condition determination instruction to obtain an execution result further comprises:
executing the jump branch instruction, and
recording an oldest instruction for which a jump branch prediction is incorrect.

19. A system-on-chip, comprising:
an instruction processing apparatus, comprising:
an instruction fetching circuitry configured to:
read a set of instructions, wherein the set of instructions comprises a speculative execution instruction and a speculative condition determination instruction, and the speculative execution instruction is an instruction to be executed according to a speculative condition of the speculative condition determination instruction;
cache one or more instructions of the set of instructions in the instruction fetching circuitry;

in response to a determination that the speculative condition determination instruction has been read, read the speculative execution instruction corresponding to the speculative condition of the speculative condition determination instruction, and in response to a determination that an execution result of the speculative condition determination instruction indicates that the speculative condition is incorrect, clear the one or more instructions cached in the instruction fetching circuitry;

an instruction decoding circuitry configured to decode the set of instructions;

an executing circuitry configured to execute the one or more instructions of the set of instructions, wherein the operation of executing the one or more instructions comprises executing the speculative condition determination instruction to obtain the execution result; and an instruction retiring circuitry configured to:

cache in the instruction retiring circuitry the one or more instructions of the set of instructions executed by the executing circuitry; and in response to an instruction older than the speculative condition determination instruction being retired, instruct the executing circuitry to clear the instructions being executed in the executing circuitry and clear the instructions cached in the instruction retiring circuitry.

20. An intelligent device, comprising:

a system-on-chip, comprising:

an instruction processing apparatus, comprising:

an instruction fetching circuitry configured to:

read a set of instructions, wherein the set of instructions comprises a speculative execution instruction and a speculative condition determination instruction, and the speculative execution instruction is an instruction to be executed according to a speculative condition of the speculative condition determination instruction;

cache one or more instructions of the set of instructions in the instruction fetching circuitry;

in response to a determination that the speculative condition determination instruction has been read, read the speculative execution instruction corresponding to the speculative condition of the speculative condition determination instruction, and in response to a determination that an execution result of the speculative condition determination instruction indicates that the speculative condition is incorrect, clear the one or more instructions cached in the instruction fetching circuitry;

an instruction decoding circuitry configured to decode the set of instructions;

an executing circuitry configured to execute the one or more instructions of the set of instructions, wherein the operation of executing the one or more instructions comprises executing the speculative condition determination instruction to obtain the execution result; and an instruction retiring circuitry configured to:

cache in the instruction retiring circuitry the one or more instructions of the set of instructions executed by the executing circuitry; and in response to an instruction older than the speculative condition determination instruction being retired, instruct the executing circuitry to clear the instructions being executed in the executing circuitry and clear the instructions cached in the instruction retiring circuitry.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Those skilled in the art should understand that the modules, circuitries, units or components of the device in the examples disclosed herein may be arranged in the device as described in the embodiments, or alternatively may be positioned in one or more devices different from the device. The modules, circuitries, units or components, may be combined into one module or, in addition, may be divided into a plurality of sub-modules.

In addition, those skilled in the art can understand that although some of the embodiments described herein include certain features included in other embodiments but not other features, the combination of features of different embodiments is meant to be within the scope of the present disclosure and form different embodiments.

As used herein, unless otherwise specified, the use of ordinal words "first," "second," "third," etc. to describe ordinary objects merely indicates different instances involving similar objects and is not intended to imply the objects described as such must have a given order in time, space, order, or in any other way.

For the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. An instruction processing apparatus including a plurality of pipeline stages, the instruction processing apparatus comprising:

an instruction fetching circuitry configured to:

read a set of instructions, wherein the set of instructions comprises a speculative condition determination instruction, one or more first instructions sequentially following the speculative condition determination instruction, one or more second instructions sequentially following the one or more first instructions, one or more third instructions sequentially following the one or more second instructions, one or more fourth instructions sequentially following the one or more third instructions, and one or more fifth instructions sequentially following the one or more fourth instructions;

cache the one or more fifth instructions of the set of instructions in the instruction fetching circuitry;

in response to a determination that an execution result of the speculative condition determination instruction indicates that a speculative condition of the speculative condition determination instruction is incorrect:

clear the one or more fifth instructions cached in the instruction fetching circuitry; and read a new set of instructions from a correct speculative condition and cache one or more new instructions from the new set of instructions in the instruction fetching circuitry, wherein the new set of instructions from the correct speculative condition is read prior to clearing all of the one or more fifth instructions, the one or more fourth instructions, the one or more third instructions, the one or more second instructions, and the one or more first instructions from all pipeline stages;

an instruction decoding circuitry configured to decode the one or more fourth instructions of the set of instructions;

an instruction scheduling circuitry configured to:
receive the one or more third instructions of the set of instructions from the instruction decoding circuitry; and
transmit the one or more third instructions of the set of instructions to an executing circuitry for execution;

the executing circuitry, wherein the executing circuitry is configured to:
cache the one or more second instructions of the set of instructions in the executing circuitry;
execute the speculative condition determination instruction to obtain the execution result; and
execute the one or more second instructions of the set of instructions; and an instruction retiring circuitry configured to:
cache, in the instruction retiring circuitry, the one or more first instructions of the set of instructions; and
in response to an instruction older than the speculative condition determination instruction being retired:
instruct the executing circuitry to clear the one or more second instructions of the set of instructions being executed in the executing circuitry; and
clear the one or more first instructions of the set of instructions cached in the instruction retiring circuitry, wherein the instruction decoding circuitry is further configured to delay sending to the instruction scheduling circuitry the one or more new instructions of the new set of instructions read from the correct speculative condition until after the one or more second instructions of the set of instructions cached in the executing circuitry are cleared.

2. The instruction processing apparatus according to claim 1, wherein the instruction scheduling circuitry is further configured to:
cache the one or more third instructions of the set of instructions in the instruction scheduling circuitry; and
clear the one or more third instructions of the set of instructions cached in the instruction scheduling circuitry in response to the speculative condition determination instruction being retired.

3. The instruction processing apparatus according to claim 1, wherein
the instruction scheduling circuitry is configured to transmit the one or more third instructions of the set of instructions out of order to the executing circuitry for execution; and
the instruction retiring circuitry is further configured to sequentially retire the one or more first instructions of the set of instructions.

4. The instruction processing apparatus according to claim 1, wherein the executing circuitry is configured to:
in response to the determination that the execution result of the speculative condition determination instruction indicates that the speculative condition of the speculative condition determination instruction is incorrect, determine whether the speculative condition determination instruction is an oldest speculative condition determination instruction having an incorrect speculation condition.

5. The instruction processing apparatus according to claim 4, wherein the executing circuitry is configured to:
compare the speculative condition determination instruction having the incorrect speculation condition with a recorded speculative condition determination instruction having an incorrect speculation condition; and
in response to a determination that the speculative condition determination instruction having the incorrect speculation condition is older than the recorded speculative condition determination instruction having the incorrect speculation condition, the instruction fetching circuitry is further configured to replace the recorded speculative condition determination instruction having the incorrect speculation condition with the speculative condition determination instruction having the incorrect speculation condition and clear the one or more fifth instructions of the set of instructions cached in the instruction fetching circuitry.

6. The instruction processing apparatus according to claim 1, wherein the speculative condition is a jump branch prediction, the speculative condition determination instruction is a jump branch instruction, and the instruction decoding circuitry is further configured to set a predicted jump branch as the speculative condition according to a historical jump record of the jump branch instruction.

7. The instruction processing apparatus according to claim 6, wherein the executing circuitry comprises a branch jump circuitry configured to:
execute the jump branch instruction, and
record an oldest instruction for which a jump branch prediction is incorrect.

8. An instruction processing method in a device including a plurality of pipeline stages, the instruction processing method comprising:
reading a set of instructions, wherein the set of instructions comprises a speculative condition determination instruction, one or more first instructions sequentially following the speculative condition determination instruction, one or more second instructions sequentially following the one or more first instructions, one or more third instructions sequentially following the one or more second instructions, one or more fourth instructions sequentially following the one or more third instructions, and one or more fifth instructions sequentially following the one or more fourth instructions;
caching the one or more fifth instructions of the set of instructions in an instruction fetching circuitry;

decoding the one or more fourth instructions of the set of instructions by an instruction decoding circuitry;

receiving, by an instruction scheduling circuitry, the one or more third instructions of the set of instructions from the instruction decoding circuitry;

transmitting the one or more third instructions of the set of instructions from the instruction scheduling circuitry to an executing circuitry;

caching the one or more second instructions of the set of instructions in the executing circuitry;

executing the speculative condition determination instruction by the executing circuitry to obtain an execution result of the speculative condition determination instruction;

executing the one or more second instructions of the set of instructions by the executing circuitry;

in response to a determination that the execution result of the speculative condition determination instruction indicates that a speculative condition of the speculative condition determination instruction is incorrect:

clearing the one or more fifth instructions of the set of instructions cached in the instruction fetching circuitry; and reading a new set of instructions from a correct speculative condition and caching one or more new instructions from the new set of instructions in the instruction fetching circuitry, wherein the new set of instructions from the correct speculative condition is read prior to clearing all of the one or more fifth instructions, the one or more fourth instructions, the one or more third instructions, the one or more second instructions, and the one or more first instructions from all pipeline stages;

caching, in an instruction retiring circuitry, the one or more first instructions of the set of instructions;

in response to an instruction older than the speculative condition determination instruction being retired:

clearing the one or more second instructions of the set of instructions being executed in the executing circuitry, and clearing the one or more first instructions of the set of instructions cached in the instruction retiring circuitry; and delaying sending to the instruction scheduling circuitry the one or more new instructions of the new set of instructions read from the correct speculative condition until after the one or more second instructions of the set of instructions cached in the executing circuitry are cleared.

9. The instruction processing method according to claim 8, further comprising:

caching, by the instruction scheduling circuitry, the one or more third instructions of the set of instructions; and clearing the one or more third instructions cached in the instruction scheduling circuitry in response to the speculative condition determination instruction being retired.

10. The instruction processing method according to claim 8, wherein transmitting, by the instruction scheduling circuitry, the one or more third instructions of the set of instructions for execution comprises transmitting, by the instruction scheduling circuitry, the one or more third instructions of the set of instructions out of order for execution; and the instruction processing method further comprises sequentially retiring the one or more first instructions of the set of instructions.

11. The instruction processing method according to claim 8, further comprising:

in response to the determination that the execution result of the speculative condition determination instruction indicates that the speculative condition of the speculative condition determination instruction is incorrect, determining whether the speculative condition determination instruction is an oldest speculative condition determination instruction having an incorrect speculation condition.

12. The instruction processing method according to claim 11, wherein determining whether the speculative condition determination instruction is the oldest speculative condition determination instruction having the incorrect speculation condition comprises:

comparing the speculative condition determination instruction having the incorrect speculation condition with a recorded speculative condition determination instruction having an incorrect speculation condition; and in response to a determination that the speculative condition determination instruction having the incorrect speculation condition is older than the recorded speculative condition determination instruction having the incorrect speculation condition:

replacing the recorded speculative condition determination instruction having the incorrect speculation condition with the speculative condition determination instruction having the incorrect speculation condition, and determining the speculative condition determination instruction having the incorrect speculation condition as the oldest speculative condition determination instruction.

13. The instruction processing method according to claim 8, wherein the speculative condition is a jump branch prediction, the speculative condition determination instruction is a jump branch instruction, and reading a set of instructions comprises:

setting a predicted jump branch as the speculative condition according to a historical jump record of the jump branch instruction.

14. The instruction processing method according to claim 13, wherein executing the speculative condition determination instruction to obtain an execution result comprises:

executing the jump branch instruction, and recording an oldest instruction for which a jump branch prediction is incorrect.

15. A system-on-chip, comprising:

an instruction processing apparatus including a plurality of pipeline stages, the instruction processing apparatus comprising:

an instruction fetching circuitry configured to:

read a set of instructions, wherein the set of instructions comprises a speculative condition determination instruction, one or more first instructions sequentially following the speculative condition determination instruction, one or more second instructions sequentially following the one or more first instructions, one or more third instructions sequentially following the one or more second instructions, one or more fourth instructions sequentially following the one or more third instructions, and one or more fifth instructions sequentially following the one or more fourth instructions;

cache the one or more fifth instructions of the set of instructions in the instruction fetching circuitry;

in response to a determination that an execution result of the speculative condition determination instruction indicates that a speculative condition of the speculative condition determination instruction is incorrect:
clear the one or more fifth instructions of the set of instructions cached in the instruction fetching circuitry; and
read a new set of instructions from a correct speculative condition and cache one or more new instructions from the new set of instructions in the instruction fetching circuitry, wherein the new set of instructions from the correct speculative condition is read prior to clearing all of the one or more fifth instructions, the one or more fourth instructions, the one or more third instructions, the one or more second instructions, and the one or more first instructions from all pipeline stages;

an instruction decoding circuitry configured to decode the one or more fourth instructions of the set of instructions;

an instruction scheduling circuitry configured to:
receive the one or more third instructions of the set of instructions from the instruction decoding circuitry; and
transmit the one or more third instructions of the set of instructions to an executing circuitry for execution;

the executing circuitry, wherein the executing circuitry is configured to:
cache the one or more second instructions of the set of instructions in the executing circuitry;
execute the speculative condition determination instruction to obtain the execution result; and
execute the one or more second instructions of the set of instructions; and an instruction retiring circuitry configured to:
cache, in the instruction retiring circuitry, the one or more first instructions of the set of instructions; and
in response to an instruction older than the speculative condition determination instruction being retired:
instruct the executing circuitry to clear the one or more second instructions of the set of instructions being executed in the executing circuitry; and
clear the one or more first instructions of the set of instructions cached in the instruction retiring circuitry, wherein the instruction decoding circuitry is further configured to delay sending to the instruction scheduling circuitry the one or more new instructions of the new set of instructions read from the correct speculative condition until after the one or more second instructions of the set of instructions cached in the executing circuitry are cleared.

16. An intelligent device, comprising:
a system-on-chip, comprising:
an instruction processing apparatus including a plurality of pipeline stages, the instruction processing apparatus comprising:
an instruction fetching circuitry configured to:
read a set of instructions, wherein the set of instructions comprises a speculative condition determination instruction, one or more first instructions sequentially following the speculative condition determination instruction, one or more second instructions sequentially following the one or more first instructions, one or more third instructions sequentially following the one or more second instructions, one or more fourth instructions sequentially following the one or more third instructions, and one or more fifth instructions sequentially following the one or more fourth instructions;

cache the one or more fifth instructions of the set of instructions in the instruction fetching circuitry;

in response to a determination that an execution result of the speculative condition determination instruction indicates that a speculative condition of the speculative condition determination instruction is incorrect:
clear the one or more fifth instructions of the set of instructions cached in the instruction fetching circuitry; and
read a new set of instructions from a correct speculative condition and cache one or more new instructions from the new set of instructions in the instruction fetching circuitry, wherein the new set of instructions from the correct speculative condition is read prior to clearing all of the one or more fifth instructions, the one or more fourth instructions, the one or more third instructions, the one or more second instructions, and the one or more first instructions from all pipeline stages;

an instruction decoding circuitry configured to decode the one or more fourth instructions of the set of instructions;

an instruction scheduling circuitry configured to:
receive the one or more third instructions of the set of instructions from the instruction decoding circuitry; and
transmit the one or more third instructions of the set of instructions to an executing circuitry for execution;

the executing circuitry, wherein the executing circuitry is configured to:
cache the one or more second instructions of the set of instructions in the executing circuitry;
execute the speculative condition determination instruction to obtain the execution result; and
execute the one or more second instructions of the set of instructions; and an instruction retiring circuitry configured to:
cache, in the instruction retiring circuitry, the one or more first instructions of the set of instructions; and
in response to an instruction older than the speculative condition determination instruction being retired:
instruct the executing circuitry to clear the one or more second instructions of the set of instructions being executed in the executing circuitry; and
clear the one or more first instructions of the set of instructions cached in the instruction retiring circuitry, wherein the instruction decoding circuitry is further configured to delay sending to the instruction scheduling circuitry the one or more new instructions of the new set of instructions read from the correct speculative condition until after the one or more second instructions of the set of instructions cached in the executing circuitry are cleared.

\* \* \* \* \*